United States Patent
Varma et al.

(10) Patent No.: US 6,636,771 B1
(45) Date of Patent: Oct. 21, 2003

(54) METHOD AND SYSTEM FOR ANALYZING CONTINUOUS PARAMETER DATA FOR DIAGNOSTICS AND REPAIRS

(75) Inventors: Anil Varma, Clifton Park, NY (US); Nicholas Edward Roddy, Clifton Park, NY (US); David Richard Gibson, North East, PA (US)

(73) Assignee: General Electric Company, Schenectady, NY (US)

( * ) Notice: Subject to any disclaimer, the term of this patent is extended or adjusted under 35 U.S.C. 154(b) by 521 days.

(21) Appl. No.: 09/688,105

(22) Filed: Oct. 13, 2000

Related U.S. Application Data

(63) Continuation-in-part of application No. 09/285,611, filed on Apr. 2, 1999, now Pat. No. 6,343,236.
(60) Provisional application No. 60/162,045, filed on Oct. 28, 1999.

(51) Int. Cl.$^7$ ............................. G05B 9/02; G05B 11/01
(52) U.S. Cl. ............................. 700/79; 700/21; 701/19; 701/29; 714/25; 714/37
(58) Field of Search ............................ 700/21, 79, 110, 700/177; 701/19, 29, 35, 36; 702/57, 81; 714/2, 25, 26, 37

(56) References Cited

U.S. PATENT DOCUMENTS

| | | | |
|---|---|---|---|
| 4,270,174 A | 5/1981 | Karlin et al. | 364/551 |
| 4,463,418 A | 7/1984 | O'Quin, II et al. | 364/200 |
| 4,517,468 A | 5/1985 | Kemper et al. | 290/52 |
| 4,695,946 A | 9/1987 | Andreasen et al. | 364/200 |
| 4,823,914 A | 4/1989 | McKinney et al. | 187/133 |
| 4,970,725 A | 11/1990 | McEnroe et al. | 371/15.1 |
| 4,977,390 A | 12/1990 | Saylor et al. | 340/521 |
| 5,113,489 A | 5/1992 | Cihiwsky et al. | 395/113 |
| 5,123,017 A | 6/1992 | Simpkins et al. | 351/15.1 |

(List continued on next page.)

OTHER PUBLICATIONS

Data–Tronic Gas Turbine Information And Control System; General Electric Gas Turbine Reference Libraryl 8 pgs, 1981.

Trobec R. et al; "Optimization of Diagnostic Examination"; Joint International Conference on Vector and Parallel Processing; Berlin De 1994, pp 761–772, XP000974309.

*Primary Examiner*—Paul P. Gordon
(74) *Attorney, Agent, or Firm*—Carl Rowold, Esq.; Enrique J. Mora, Esq.; Beusse, Brownlee, Bowdoin & Wolter, P.A.

(57) ABSTRACT

The present invention discloses system and method for analyzing continuous parameter data from a malfunctioning locomotive or other large land-based, self-powered transport equipment. The method allows for receiving new continuous parameter data comprising a plurality of anomaly definitions from the malfunctioning equipment. The method further allows for selecting a plurality of distinct anomaly definitions from the new continuous parameter data. Respective generating steps allow for generating at least one distinct anomaly definition cluster from the plurality of distinct anomaly definitions and for generating a plurality of weighted repair and distinct anomaly definition cluster combinations. An identifying step allows for identifying at least one repair for the at least one distinct anomaly definition cluster using the plurality of weighted repair and distinct anomaly definition cluster combinations.

14 Claims, 10 Drawing Sheets

U.S. PATENT DOCUMENTS

| | | | |
|---|---|---|---|
| 5,157,610 A | 10/1992 | Asano et al. | 364/424.03 |
| 5,274,572 A | 12/1993 | O'Neill et al. | 364/550 |
| 5,282,127 A | 1/1994 | Mii | 364/130 |
| 5,321,837 A | 6/1994 | Daniel et al. | 395/650 |
| 5,329,465 A | 7/1994 | Arcella et al. | 364/551.01 |
| 5,400,018 A | 3/1995 | Scholl et al. | 340/825.54 |
| 5,406,502 A | 4/1995 | Haramaty et al. | 364/551.01 |
| 5,445,347 A | 8/1995 | Ng | 246/169 R |
| 5,463,768 A | 10/1995 | Cuddihy et al. | 395/183.13 |
| 5,508,941 A | 4/1996 | Leplingard et al. | 364/514 B |
| 5,528,516 A | 6/1996 | Yemini et al. | 364/551.01 |
| 5,566,091 A | 10/1996 | Schricker et al. | 364/551.01 |
| 5,594,663 A | 1/1997 | Messaros et al. | 364/550 |
| 5,633,628 A | 5/1997 | Denny et al. | 340/584 |
| 5,638,296 A | 6/1997 | Johnson et al. | 364/492 |
| 5,661,668 A | 8/1997 | Yemini et al. | 364/550 |
| 5,666,534 A | 9/1997 | Gilbert et al. | 395/651 |
| 5,678,002 A | 10/1997 | Fawcett et al. | 395/183.01 |
| 5,729,452 A | 3/1998 | Smith et al. | 364/424.03 |
| 5,742,915 A | 4/1998 | Stafford | 701/35 |
| 5,815,071 A | 9/1998 | Doyle | 340/439 |
| 5,835,871 A | 11/1998 | Smith et al. | 701/29 |
| 5,845,272 A | 12/1998 | Morjaria et al. | 706/50 |
| 5,950,147 A | 9/1999 | Sarangapani et al. | 702/179 |
| 5,956,664 A | 9/1999 | Bryan | 701/184 |
| 6,052,631 A | 4/2000 | Busch et al. | 702/29 |
| 6,078,851 A | 6/2000 | Sugitani | 701/34 |
| 6,175,934 B1 | 1/2001 | Hershey et al. | 714/25 |
| 6,216,066 B1 | 4/2001 | Goebel et al. | 701/29 |
| 6,263,265 B1 | 7/2001 | Fera | 701/19 |
| 6,336,065 B1 * | 1/2002 | Gibson et al. | 701/29 |
| 6,343,236 B1 * | 1/2002 | Gibson et al. | 700/79 |
| 6,415,395 B1 * | 7/2002 | Varma et al. | 714/37 |
| 6,543,007 B1 * | 4/2003 | Bliley et al. | 714/26 |

* cited by examiner

EXEMPLARY DATAFIELDS ASSOCIATED WITH ANOMALY
DEFINITIONS BASED ON CONTINUOUS PARAMETER DATA

GENERAL INFORMATION:

ANOMALY DEFINITION ID:

OBJECTIVE:

EXPLANATION:

MESSAGE TO BE GENERATED:

OWNER:

LOCOMOTIVE MODEL(S): D8 ☐ D9 ☒ AC4400 ☒ ACCONV ☒ AC6000 ☐

LOCOMOTIVE CONFIGURATION:

STATUS (DATE): DEVELOPEMENT [mm/dd/yy] IN REVIEW [mm/dd/yy] APPROVED [mm/dd/yy]

LOCOMOTIVE OPERATING CONDITIONS:

| | | | STATISTICS | TRENDS |
|---|---|---|---|---|
| LOCOMOTIVE SPEED: | ☐ | < MPH < | ☐ | ☐ |
| ENGINE RPM: | ☐ | < MPH < | ☐ | ☐ |
| GROSS HP: | ☐ | < MPH < | ☐ | ☐ |
| NOTCH CALL: | ☐ | | | |
| MAX. NOTCH ALLOWED: | ☐ | | | |
| OPERATING MODE: | DYNAMIC BRAKE ☐ | MOTORING ☐ | SELF-LOAD ☐ | |

54

MONITORED PARAMETERS & SENSORS:

| NAME | NUMBER | LOWER LIMIT | | UPPER LIMIT | STATISTICS | TRENDS |
|---|---|---|---|---|---|---|
| PARAM1 | ☐ | ☐ | < PARAM1 < | ☐ | ☐ | ☐ |
| PARAM2 | ☐ | ☐ | < PARAM2 < | ☐ | ☐ | ☐ |
| PARAM3 | ☐ | ☐ | < PARAM3 < | ☐ | ☐ | ☐ |
| PARAM4 | ☐ | ☐ | < PARAM4 < | ☐ | ☐ | ☐ |

| 7311 | 24 |
|------|----|
| 728F | 2  |
| 76D5 | 1  |
| 720F | 1  |

Fig. 5A

| 7311 |
|------|
| 728F |
| 76D5 |
| 720F |

Fig. 5B

| 76D5 | 7311 |
|------|------|
| 76D5 | 728F |
| 76D5 | 720F |
| 7311 | 728F |
| 7311 | 720F |
| 728F | 720F |

Fig. 5C

| 76D5 | 7311 | 728F |
|------|------|------|
| 76D5 | 7311 | 720F |
| 76D5 | 728F | 720F |
| 7311 | 728F | 720F |

Fig. 5D

| 76D5 | 7311 | 728F | 720F |
|------|------|------|------|

250 ↘

| 252 ↘ | 253 | 254 | | | 253 | 255 | | |
|---|---|---|---|---|---|---|---|---|
| ENTERED | 1777 | WITH | 0.850 | BASED ON | 1777 | 7311 | 728F | 720F |
| ENTERED | 1766 | WITH | 0.850 | BASED ON | 1766 | 7311 | 728F | 720F |
| ENTERED | 1715 | WITH | 0.364 | BASED ON | 1715 | 76D5 | 7311 | |
| ENTERED | 1677 | WITH | 0.300 | BASED ON | 1677 | 7311 | 720F | |
| STORING | 1777 | WITH | 0.300 | BASED ON | 1777 | 7311 | 720F | |
| STORING | 1766 | WITH | 0.300 | BASED ON | 1766 | 7311 | 720F | |
| STORING | 1777 | WITH | 0.300 | BASED ON | 1777 | 7311 | 728F | |
| STORING | 1677 | WITH | 0.300 | BASED ON | 1677 | 7311 | 728F | |
| STORING | 1766 | WITH | 0.300 | BASED ON | 1766 | 7311 | 728F | |
| ENTERED | 1745 | WITH | 0.280 | BASED ON | 1745 | 76D5 | 728F | 720F |
| ENTERED | 2323 | WITH | 0.273 | BASED ON | 2323 | 76D5 | 7311 | |
| STORING | 1677 | WITH | 0.273 | BASED ON | 1677 | 76D5 | 7311 | |
| STORING | 1715 | WITH | 0.211 | BASED ON | 1715 | 7311 | | |
| STORING | 1745 | WITH | 0.200 | BASED ON | 1745 | 76D5 | 728F | |
| STORING | 1745 | WITH | 0.184 | BASED ON | 1745 | 76D5 | 720F | |
| STORING | 2323 | WITH | 0.160 | BASED ON | 2323 | 76D5 | | |
| STORING | 1677 | WITH | 0.158 | BASED ON | 1677 | 7311 | | |
| STORING | 1777 | WITH | 0.158 | BASED ON | 1777 | 7311 | | |
| STORING | 1766 | WITH | 0.158 | BASED ON | 1766 | 7311 | | |
| STORING | 2323 | WITH | 0.158 | BASED ON | 2323 | 7311 | | |
| STORING | 1745 | WITH | 0.148 | BASED ON | 1745 | 728F | 720F | |
| ENTERED | 1869 | WITH | 0.143 | BASED ON | 1869 | 7311 | 728F | 720F |
| STORING | 1745 | WITH | 0.130 | BASED ON | 1745 | 728F | | |
| ENTERED | 2142 | WITH | 0.130 | BASED ON | 2142 | 728F | 720F | |
| STORING | 1869 | WITH | 0.120 | BASED ON | 1869 | 76D5 | 728F | 720F |
| ENTERED | 1814 | WITH | 0.105 | BASED ON | 1814 | 7311 | | |
| STORING | 2142 | WITH | 0.103 | BASED ON | 2142 | 720F | | |
| STORING | 2142 | WITH | 0.101 | BASED ON | 2142 | 728F | | |

260 ↘ NUMBER OF DISTINCT ANOMALY DEFINITION
IN CURRENT CASE IS: 4

| 1766- | EFI | MATCHES | 0.850 | |
|---|---|---|---|---|
| 1777- | PRESSURE PUMP | MATCHES | 0.850 | |
| 1677- | TRACTION PROBLEM | MATCHES | 1.031 | CASES:32 |
| 1745- | LOCOMOTIVE SOFTWARE PROBLEMS | MATCHES | 0.943 | CASES:39 |
| 2323- | ENGINE OVER HEATED | MATCHES | 0.591 | CASES:71 |

Fig. 8

METHOD AND SYSTEM FOR ANALYZING CONTINUOUS PARAMETER DATA FOR DIAGNOSTICS AND REPAIRS

This application is continuation-in-part of application Ser. No. 09/285,611, filed Apr. 2, 1999 now U.S. Pat. No. 6,343,236 issued Jan. 29, 2002. This application further claims the benefit of U.S. Provisional Application No. 60/162,045 filed Oct. 28, 1999.

BACKGROUND OF THE INVENTION

The present invention relates generally to machine diagnostics, and more specifically, to a system and method for processing historical repair data and continuous parameter data for predicting one or more repairs from new continuous parameter data from a malfunctioning machine.

A machine such as locomotive includes elaborate controls and sensors that generate faults when anomalous operating conditions of the locomotive are encountered. Typically, a field engineer will look at a fault log and determine whether a repair is necessary.

Approaches like neural networks, decision trees, etc., have been employed to learn over input data to provide prediction, classification, and function approximation capabilities in the context of diagnostics. Often, such approaches have required structured and relatively static and complete input data sets for learning, and have produced models that resist real-world interpretation.

Another approach, Case Based Reasoning (CBR), is based on the observation that experiential knowledge (memory of past experiences—or cases) is applicable to problem solving as learning rules or behaviors. CBR relies on relatively little pre-processing of raw knowledge, focusing instead on indexing, retrieval, reuse, and archival of cases. In the diagnostic context, a case generally refers to a problem/solution description pair that represents a diagnosis of a problem and an appropriate repair. More particularly, a case is a collection of fault log and corresponding continuous and snapshot data patterns and other parameters and indicators associated with one specific repair event in the machine under consideration.

CBR assumes cases described by a fixed, known number of descriptive attributes. Conventional CBR systems assume a corpus of fully valid or "gold standard" cases that new incoming cases can be matched against.

U.S. Pat. No. 5,463,768 discloses an approach which uses error log data and assumes predefined cases with each case associating an input error log to a verified, unique diagnosis of a problem. In particular, a plurality of historical error logs are grouped into case sets of common malfunctions. From the group of case sets, common patterns, i.e., consecutive rows or strings of data, are labeled as a block. Blocks are used to characterize fault contribution for new error logs that are received in a diagnostic unit.

For a continuous fault code stream where any or all possible fault codes may occur from zero to any finite number of times and the fault codes may occur in any order, predefining the structure of a case is nearly impossible.

U.S. Pat. No. 6,343,236 issued Jan. 29, 2002 assigned to the same assignee of the present invention, discloses a system and method for processing historical repair data and fault log data, which is not restricted to sequential occurrences of fault log entries and which provides weighted repair and distinct fault cluster combinations, to facilitate analysis of new fault log data from a malfunctioning machine. Further, U.S. Pat. No. 6,415,395, issued Jul. 2, 2002, assigned to the same assignee of the present invention, discloses a system and method for analyzing new fault log data from a malfunctioning machine in which the system and method are not restricted to sequential occurrences of fault log entries, and wherein the system and method predict one or more repair actions using predetermined weighted repair and distinct fault cluster combinations. Additionally, U.S. Pat. No. 6,336,065, Jan. 1, 2002, assigned to the same assignee of the present invention, discloses a system and method that uses snapshot observations of operational parameters from the machine in combination with the fault log data in order to further enhance the predictive accuracy of the diagnostic algorithms used therein.

It is believed that the inventions disclosed in the foregoing patent applications provide substantial advantages and advancements in the art of diagnostics. It would be desirable, however, to provide a system and method that uses anomaly definitions based on continuous parameters to generate diagnostics and repair data. The anomaly definitions are different from faults in the sense that the information used can be taken in a relatively wide time window, whereas faults, or even fault data combined with snapshot data, are based on discrete behavior occurring at one instance in time. The anomaly definitions, however, may be advantageously analogized to virtual faults and thus such anomaly definitions can be learned using the same diagnostics algorithms that can be used for processing fault log data.

SUMMARY OF THE INVENTION

Generally speaking, the present invention in one exemplary embodiment fulfills the forgoing needs by providing a method for analyzing continuous parameter data from a malfunctioning locomotive or other large land based, self-powered transport equipment. The method allows for receiving new continuous parameter data comprising a plurality of anomaly definitions from the malfunctioning equipment. The method further allows for selecting a plurality of distinct anomaly definitions from the new continuous parameter data. Respective generating steps allow for generating at least one distinct anomaly definition cluster from the plurality of distinct anomaly definitions and for generating a plurality of weighted repair and distinct anomaly definition cluster combinations. An identifying step allows for identifying at least one repair for the at least one distinct anomaly definition cluster using the plurality of weighted repair and distinct anomaly definition cluster combinations.

The present invention further fulfills the foregoing needs by providing in another aspect thereof a system for analyzing continuous parameter data from a malfunctioning locomotive or other large land-based, self-powered transport equipment. The system includes a directed weight data storage unit adapted to store a plurality of weighted repair and distinct anomaly definition cluster combinations. A processor is adapted to receive new continuous parameter data comprising a plurality of anomaly definitions from the malfunctioning equipment. Processor allows for selecting a plurality of distinct anomaly definitions from the new continuous parameter data. Processor further allows for generating at least one distinct anomaly definition cluster from the selected plurality of distinct anomaly definitions and for generating a plurality of weighted repair and distinct anomaly definition cluster combinations. Processor 12 also allows for identifying at least one repair for the at least one distinct anomaly definition cluster using the plurality of predetermined weighted repair and distinct anomaly definition cluster combinations.

BRIEF DESCRIPTION OF THE DRAWINGS

FIG. 4 is an illustration of distinct anomaly definitions identified in the new continuous parameter data, such as may be represented in FIG. 2, and the number of occurrences thereof;

FIGS. 5A–5D are illustrations of distinct fault anomaly definition clusters for the distinct faults identified in FIG. 4;

FIG. 8 is a printout of weighted repair and anomaly definition cluster combinations provided by the system shown in FIG. 1 for continuous parameter that may be represented in FIG. 2, and a listing of recommended repairs;

DETAILED DESCRIPTION OF THE INVENTION

Figure 1:
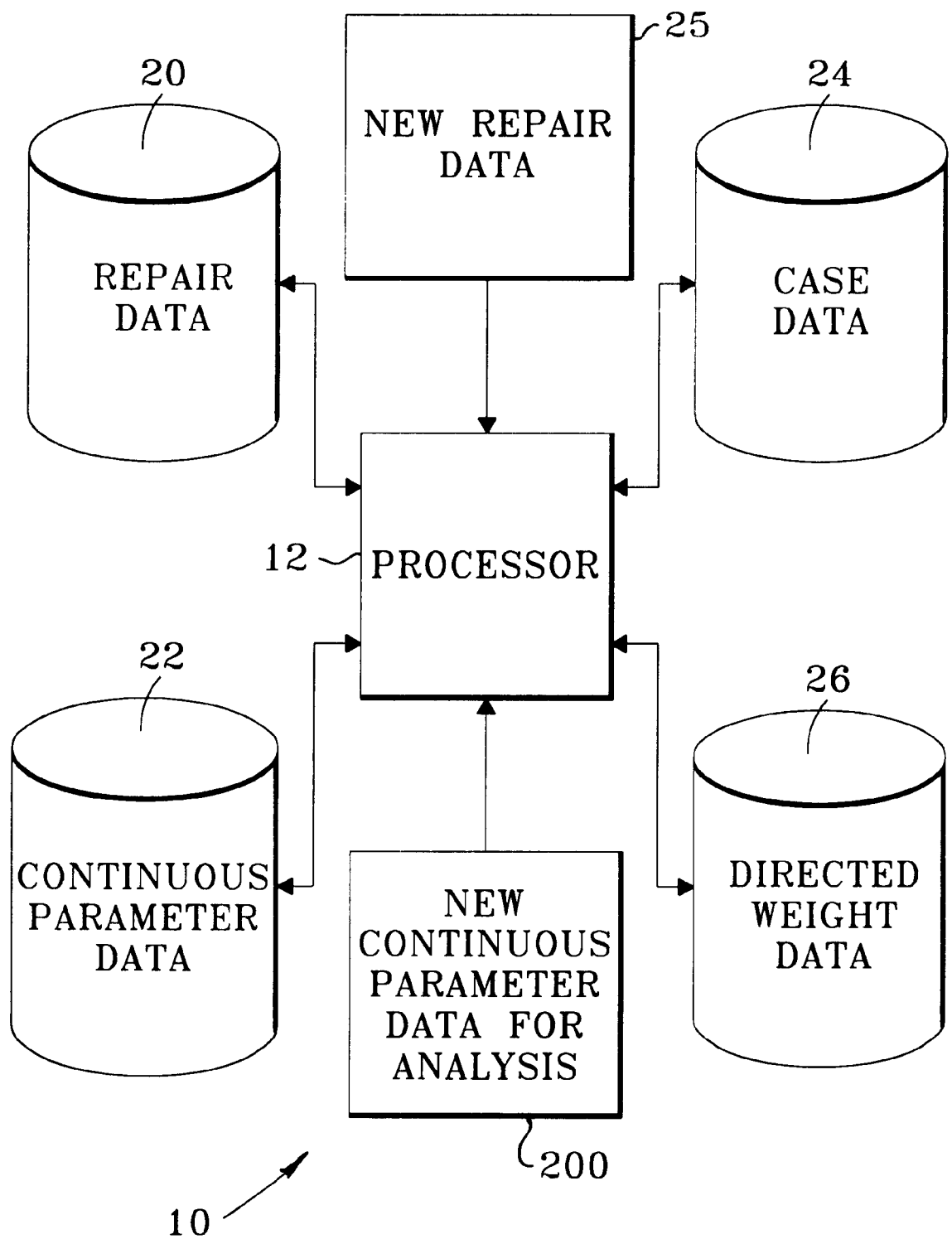
FIG. 1 is one embodiment of a block diagram of a system of the present invention for automatically processing repair data and continuous parameter data from one or more machines and diagnosing a malfunctioning machine.

FIG. 1 diagrammatically illustrates one exemplary embodiment of a system 10 of the present invention. In one aspect, system 10 provides automated analysis of continuous parameter data, from a malfunctioning machine such as a locomotive, and prediction of one or more possible repair actions.

Although the present invention is described with reference to a locomotive, system 10 can be used in conjunction with any machine in which operation of the machine is monitored, such as a chemical, an electronic, a mechanical, a microprocessor machine and any other land-based, self-powered transport equipment.

Exemplary system 10 includes a processor 12 such as a computer (e.g., UNIX workstation) having a hard drive, input devices such as a keyboard, a mouse, magnetic storage media (e.g., tape cartridges or disks), optical storage media (e.g., CD-ROMs), and output devices such as a display and a printer. Processor 12 is operably connected to a repair data storage unit 20, a continuous parameter data storage unit 22, a case data storage unit 24, and a directed weight data storage unit 26.

Figures 2, 2A:
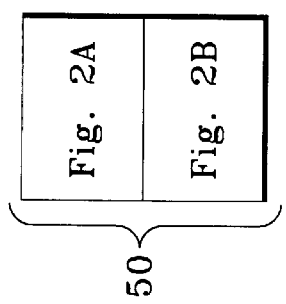
FIG. 2 is an illustration of an exemplary data structure including data fields that may be used for specifying an anomaly definition and including exemplary new continuous parameter data from a malfunctioning machine.

FIG. 2 shows an exemplary data structure 50 comprising a plurality of data fields, generally associated with anomaly definitions based on continuous parameter data. As shown in FIG. 2, a set of data fields 52 may include general information regarding each anomaly definition, such as anomaly definition identifier, objective, explanatory remarks, message to be automatically generated upon detection of a respective anomaly definition, personnel responsible for handling a respective anomaly definition, locomotive model and configuration, etc. As further shown in FIG. 2, a set of data fields 54 may include observations indicative of locomotive operating conditions that may be associated with an anomaly definition, including statistics data and trend data that may be extracted from such observations. FIG. 2 further shows a set of data fields 56 that may include continuous operational parameter data that may be associated with a given anomaly definition. For example, if parameter 1 is outside a predefined range, and the standard deviation of parameter 2 is beyond a predefined level, and parameter 3 exhibits a trend that exceeds a predefined rate of change, and parameter 4 is outside another predefined range under a given set of locomotive operating condition, then, assuming each of the above conditions is met, and further assuming that there is an anomaly definition specifying each of such conditions, that would constitute detection of such anomaly definition, that is, the occurrence of each of such events would trigger that anomaly definition. It will be appreciated that the level of information that can be obtained from anomaly definitions based on continuous parameter data comprising a selectable time window is more statistically robust compared to fault log data that are based on the occurrence of single instance events. The inventors of the present invention have advantageously recognized that diagnostics algorithm techniques typically associated with the processing of fault log data may now be extended to processing anomaly definitions based on continuous parameter data, as opposed to singular time events.

Figure 3:
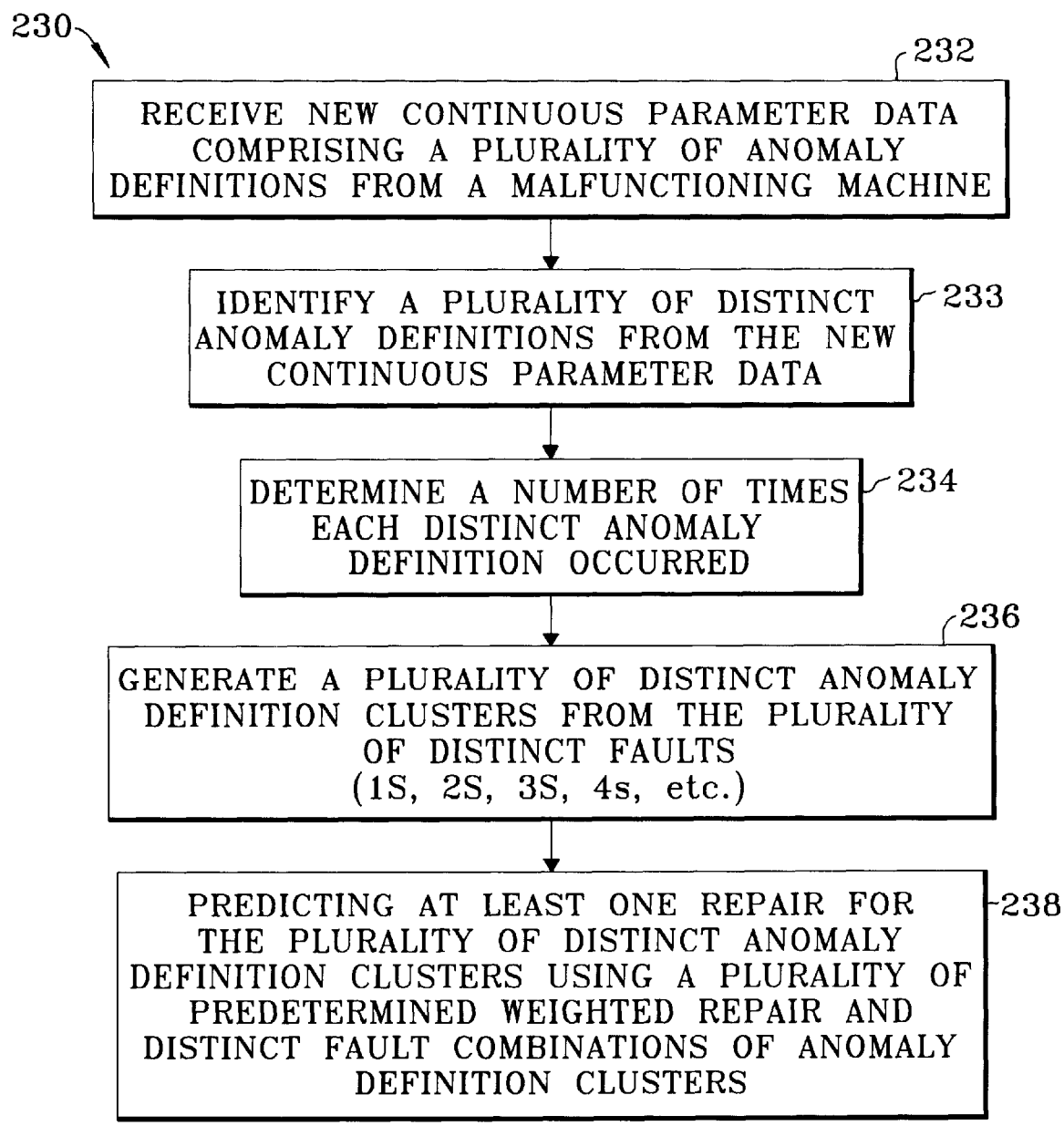
FIG. 3 is a flowchart describing the steps for analyzing the new continuous parameter data from a malfunctioning machine and predicting one or more possible repair actions.

FIG. 3 is a flowchart which generally describes the steps for analyzing new continuous parameter data 200 (FIG. 1). As shown in FIG. 3 at 232, the new continuous parameter data comprising a plurality of anomaly definitions from a malfunctioning machine is received. At 233, a plurality of distinct anomaly definitions from the new continuous parameter data is identified, and at 234, the number of times each distinct anomaly definition occurred in the new continuous parameter data is determined. As used herein, the term "distinct anomaly definition" is an anomaly definition or anomaly code which differs from other anomaly definitions or anomaly codes so that, as described in greater detail below, if the continuous parameter data includes more than one occurrence of the same anomaly definition or anomaly code, then similar anomaly definitions or anomaly codes are identified only once. As will become apparent from the discussion below, in one exemplary embodiment, it is the selection or triggering of distinct anomaly definitions which is important and not the order or sequence of their arrangement.

FIG. 4 shows an exemplary plurality of distinct anomaly definitions and the number of times in which each distinct anomaly definition occurred for continuous parameter 220 (FIG. 2). In this example, anomaly definition code 7311 represents a phase module malfunction which occurred 24 times, anomaly definition code 728F indicates an inverter propulsion malfunction which occurred twice, anomaly definition code 76D5 indicates an anomaly definition which occurred once, and anomaly definition code 720F indicates an inverter propulsion malfunction which occurred once.

With reference again to FIG. 3, a plurality of anomaly definition clusters is generated for the distinct anomaly definitions at 236. FIGS. 5A–5D illustrate the distinct anomaly definition clusters generated from the distinct anomaly definitions extracted from continuous parameter data 200. Four single anomaly definition clusters (e.g., anomaly definition code 7311, anomaly definition code 728F, anomaly definition code 76D5, and anomaly definition code 720F) are illustrated in FIG. 5A. Six double anomaly definition clusters (e.g., anomaly definition codes 76D5 and 7311, anomaly definition codes 76D5 and 728F, anomaly definition codes 76D5 and 720F, anomaly definition codes 7311 and 728F, anomaly definition codes 7311 and 720F, and anomaly definition codes 728F and 720F) are illustrated in FIG. 5B. Four triple anomaly definition clusters (e.g., anomaly definition codes 76D5, 7311, and 728F), anomaly definition codes 76D5, 7311, and 720F, anomaly definition codes 76D5, 728F, and 720F, and anomaly definition codes 7311, 728F, and 720F) are illustrated in FIG. 5C, and one quadruple anomaly definition cluster (e.g., 76D5, 7311, 728F, and 720F) is illustrated in FIG. 5D.

From the present description, it will be appreciated by those skilled in the art that an anomaly definition log having a greater number of distinct anomaly definitions would result in a greater number of distinct anomaly definition clusters (e.g., ones, twos, threes, fours, fives, etc.).

At 238, at least one repair is predicted for the plurality of anomaly definition clusters using a plurality of predetermined weighted repair and anomaly definition cluster combinations. The plurality of predetermined weighted repair and anomaly definition cluster combinations may be generated as follows.

With reference again to FIG. 1, processor 12 is desirably operable to process historical repair data contained in a repair data storage unit 20 and historical continuous parameter data contained in a continuous parameter data storage unit 22 regarding one or more locomotives.

For example, repair data storage unit 20 includes repair data or records regarding a plurality of related and unrelated repairs for one or more locomotives. Continuous parameter data storage unit 22 includes continuous parameter data or records regarding a plurality of anomaly definitions occurring for one or more locomotives.

Figure 6:
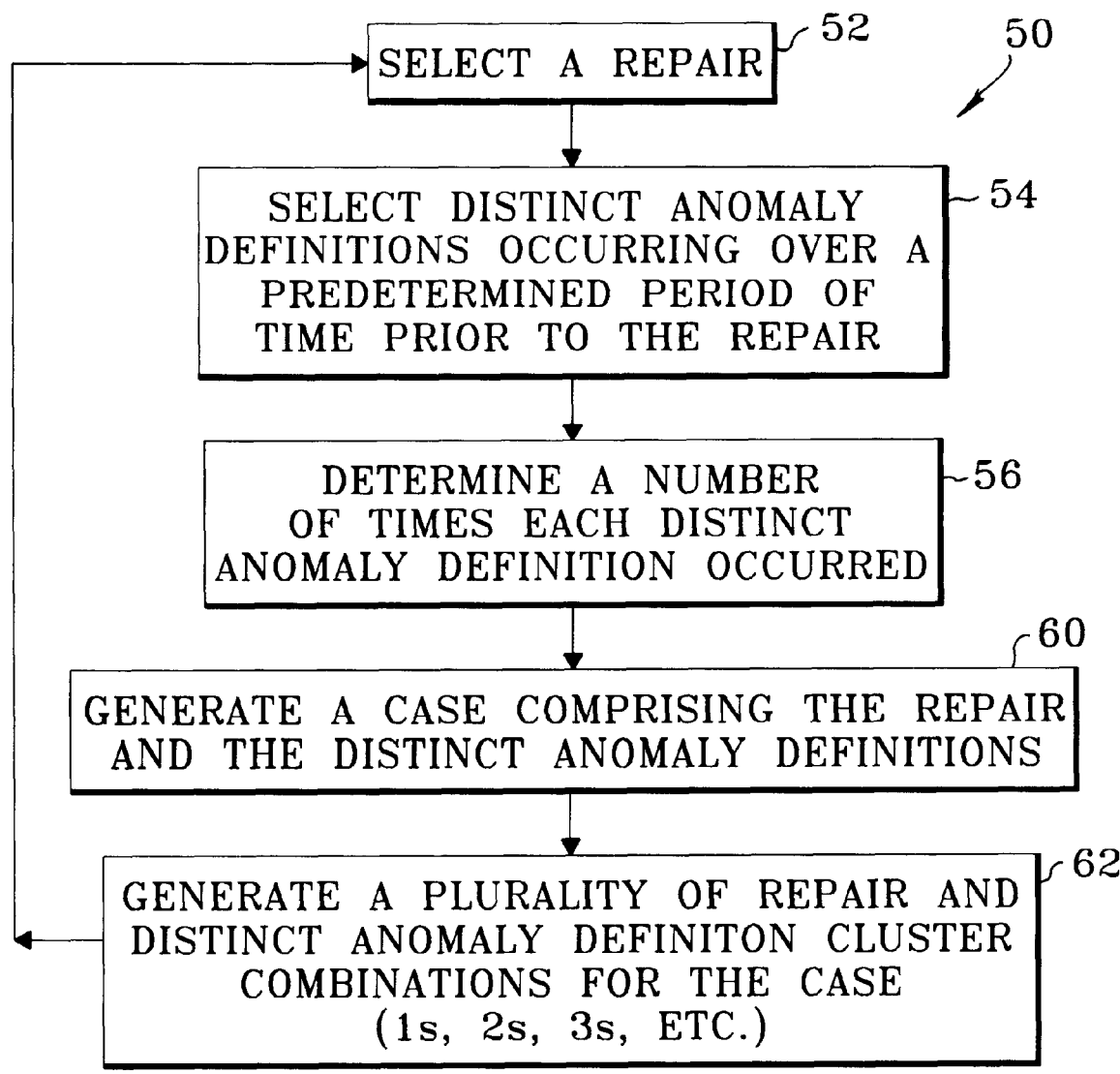
FIG. 6 is a flowchart describing the steps for generating a plurality of predetermined cases, and predetermined repair and anomaly definition cluster combinations for each case.

FIG. 6 is a flowchart of an exemplary process 50 of the present invention for selecting or extracting repair data from repair data storage unit 20 and continuous parameter data from the continuous parameter data storage unit 22 and generating a plurality of cases, and repair and anomaly definition cluster combinations.

Exemplary process 50 comprises, at 52, selecting or extracting a repair from repair data storage unit 20 (FIG. 1). Given the identification of a repair, the present invention searches continuous parameter data storage unit 22 (FIG. 1) to select or extract anomaly definitions occurring over a predetermined period of time prior to the repair, at 54. At 56, the number of times each distinct anomaly definition occurred during the period of time is determined.

A repair and corresponding distinct anomaly definitions are summarized and stored as a case, at 60. For each case, a plurality of repair and anomaly definition cluster combinations are generated at 62 (in a similar manner as described for the new continuous parameter data).

Process 50 is repeated by selecting another repair entry from repair data to generate another case, and to generate a plurality of repair and anomaly definition cluster combinations. Case data storage unit 24 desirably comprises a plurality of cases comprising related and unrelated repairs.

Figure 7:
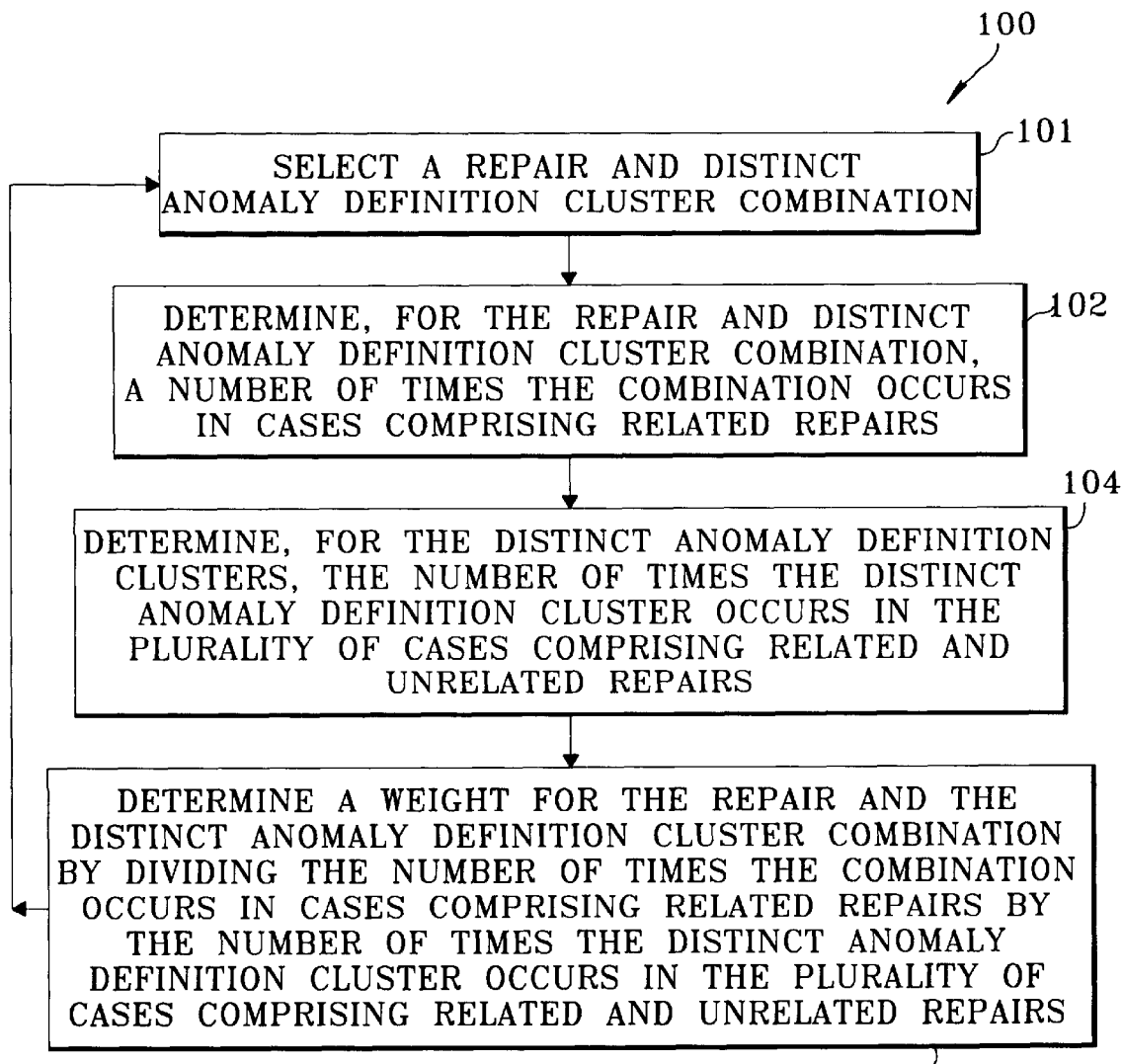
FIG. 7 is a flowchart describing the steps for determining predetermined weighted repair and anomaly definition cluster combinations.

FIG. 7 is a flowchart of an exemplary process 100 of the present invention for generating weighted repair and anomaly definition cluster combinations based on the plurality of cases generated in process 50. Process 100 comprises, at 101, selecting a repair and anomaly definition cluster combination, and determining, at 102, the number of times the combination occurs for related repairs. The number of times the combination occurs in the plurality of cases of related and unrelated repairs, e.g., all repairs for similar locomotives, is determined at 104. A weight is determined at 108 for the repair and distinct anomaly definition cluster combination by dividing the number of times the distinct anomaly definition cluster occurs in related cases by the number of times the distinct anomaly definition cluster occurs in all, e.g., related and unrelated cases, and the weighted repair and distinct anomaly definition cluster combination is desirably stored in a directed weight data storage unit 26.

FIG. 8 illustrates an exemplary printout 250 of the results generated by system 10 (FIG. 1) based on continuous parameter data 200 (FIG. 1), in which in a first portion 252, a plurality of corresponding repairs 253, assigned weights 254, and anomaly definition clusters 255 are presented. As shown in a second portion 260 of printout 250, five recommendations for likely repairs actions are presented for review by a field engineer.

Figure 9:
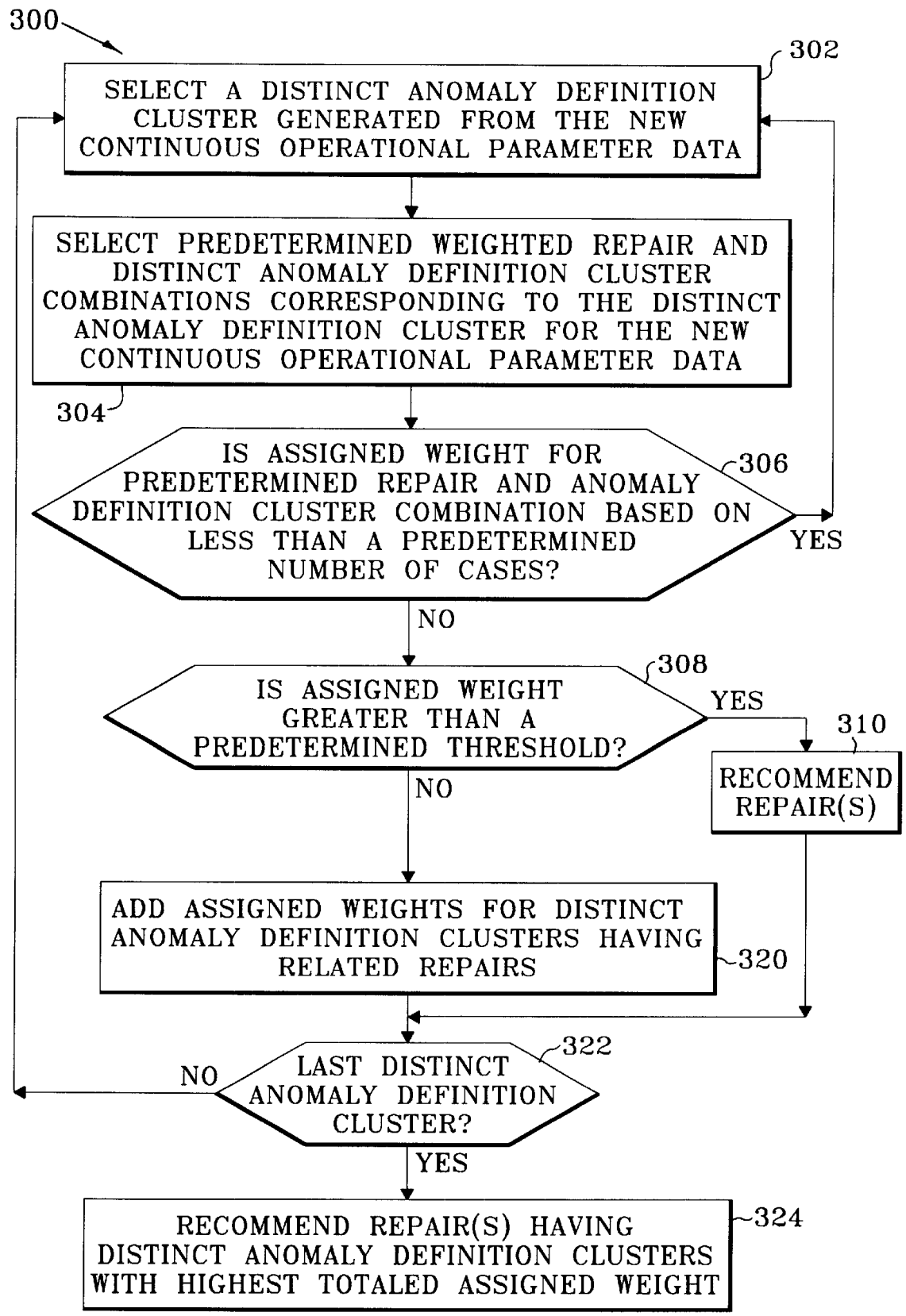
FIG. 9 is a flowchart further describing the step of predicting repairs from the weighted repair and anomaly definition cluster combinations shown in FIG. 8.

FIG. 9 is a flowchart of an exemplary process 300 for determining and presenting the top most likely repair candidates which may include repairs derived from predetermined weighted repair and distinct anomaly definition cluster combinations having the greatest assigned weighted values or repairs which are determined by adding together the assigned weighted values for anomaly definition clusters for related repairs.

As shown in FIG. 9, initially, a distinct anomaly definition cluster generated from the new continuous parameter data is selected at 302. At 304, predetermined repair(s) and assigned weight(s) corresponding to the distinct anomaly definition cluster are selected from directed weight storage unit 26 (FIG. 1).

At 306, if the assigned weight for the predetermined weighted repair and anomaly definition cluster combination is determined by a plurality of cases for related and unrelated repairs which number is less than a predetermined number, e.g., 5, the cluster is excluded and the next distinct anomaly definition cluster is selected at 302. This prevents weighted repair and anomaly definition cluster combinations which are determined from only a few cases from having the same effect in the prediction of repairs as weighted repair and anomaly definition cluster combinations determined from many cases.

If the number of cases is greater than the predetermined minimum number of cases, at 308, a determination is made as to whether the assigned value is greater than a threshold value, e.g., 0.70 or 70%. If so, the repair is displayed at 310. If the anomaly definition cluster is not the last anomaly definition cluster to be analyzed at 322, the next distinct anomaly definition cluster is selected at 302 and the process is repeated.

If the assigned weight for the predetermined weighted repair and anomaly definition cluster combination is less than the predetermined threshold value, the assigned weights for related repairs are added together at 320. Desirably, up to a maximum number of assigned weights, e.g., 5, are used and added together. After selecting and analyzing the distinct anomaly definition clusters generated from the new continuous parameter data, the repairs having the highest added assigned weights for anomaly definition clusters for related repairs are displayed at 324.

With reference again to FIG. 8, repairs corresponding to the weighted repair and anomaly definition cluster combinations in which the assigned weights are greater than the threshold value are presented first. As shown in FIG. 8, repair codes 1766 and 1777 and distinct anomaly definition cluster combinations 7311, 728F, and 720F, have an assigned weight of 85% and indicate a recommended replacement of the EFI.

As also shown in FIG. 8, repairs for various anomaly definition clusters having the highest added or total weight are presented next. For example, repair code 1677 which corresponds to a traction problem has a totaled assigned weight of 1.031, repair code 1745 which corresponds to a locomotive software problem has a totaled assigned weight of 0.943, and repair code 2323 which corresponds to an overheated engine has a totaled assigned weight of 0.591.

Advantageously, the top five most likely repair actions are determined and presented for review by a field engineer. For example, up to five repairs having the greatest assigned weights over the threshold value are presented. When there is less than five repairs which satisfy the threshold, the remainder of recommended repairs are presented based on a total assigned weight.

Desirably the new continuous parameter data is initially compared to a prior continuous parameter data from the malfunctioning locomotive. This allows determination whether there is a change in the continuous parameter data over time. For example, if there is no change, e.g., no new anomaly definitions, then it may not be necessary to process the new continuous parameter data further.

Figure 10:
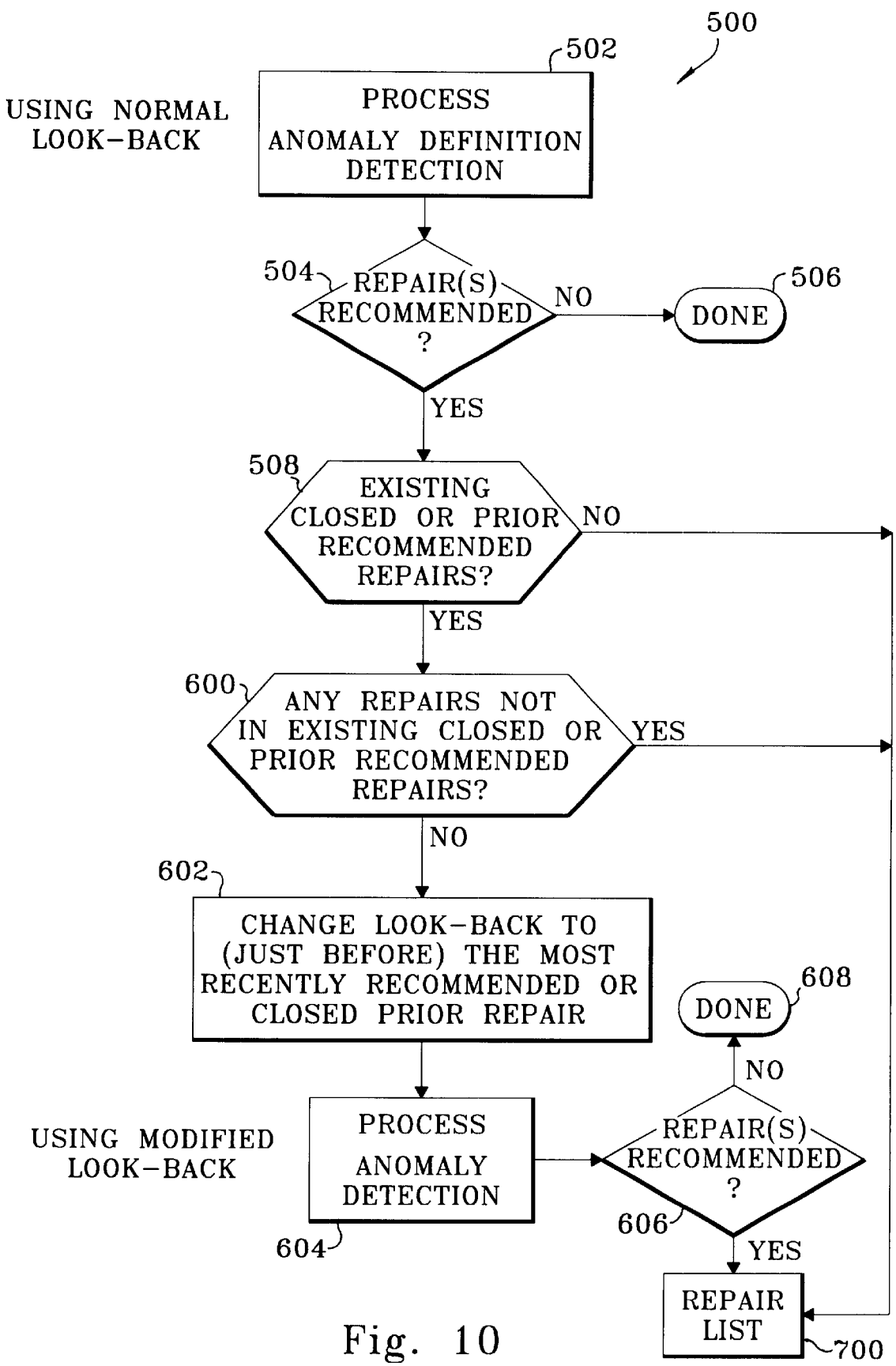
FIG. 10 is one embodiment of a flowchart describing the steps for automatically analyzing new continuous parameter data from a malfunctioning machine and predicting one or more possible repair actions.

FIG. 10 illustrates a flowchart of an exemplary automated process 500 for analyzing continuous parameter data from a locomotive, e.g., new continuous parameter data which is generated every day, using system 10. In particular, process 500 accommodates the situation where a prior repair is undertaken or a prior repair is recommended within the predetermined period of time over which the continuous parameter data is analyzed. This avoids recommending the same repair which has been previously recommended and/or repaired.

At 502, new continuous parameter data is received which includes anomaly definitions occurring over a predetermined period of time, e.g., 14 days. The continuous parameter data is analyzed, for example as described above, generating distinct anomaly definition clusters and comparing the generated anomaly definition clusters to predetermined weighted repair and anomaly definition cluster combinations.

At 504, the analysis process may use a thresholding process described above to determine whether any repairs are recommended (e.g., having a weighted value over 70%). If no repairs are recommended, the process is ended at 506. The process is desirably repeated again with a download of new continuous parameter data the next day.

If a repair recommendation is made, existing closed (e.g., performed or completed repairs) or prior recommended repairs which have occurred within the predetermined period of time are determined at 508. For example, existing closed or prior recommended repairs may be stored and retrieved from repair data storage unit 20. If there are no existing or recommended repairs than all the recommended repairs at 504 are listed in a repair list at 700.

If there are existing closed or prior recommended repairs, then at 600, any repairs not in the existing closed or prior recommended repairs are listed in the repair list at 700.

For repairs which are in the existing closed or prior recommended repairs, at 602, the look-back period (e.g., the number of days over which the anomaly definitions are chosen) is revised. Using the modified look-back or shortened period of time, the modified continuous parameter data is analyzed at 604, as described above, using distinct anomaly definition clusters, and comparing the generated anomaly definition clusters to predetermined weighted repair and anomaly definition cluster combinations.

At 606, the analysis process may use the thresholding process described above to determine whether any repairs are recommended (e.g., having a weighted value over 70%). If no repairs are recommended, the process is ended at 608 until the process is stated again with a new continuous parameter data from the next day, or if a repair is recommended it is added to the repair list at 700.

From the present description, it will be appreciated by those skilled in the art that other processes and methods, e.g., different thresholding values or continuous parameter data analysis which does not use distinct anomaly definition clusters, may be employed in predicting repairs from the new continuous parameter data according to process 500 which takes into account prior performed repairs or prior recommended repairs.

Thus, the present invention provides in one aspect a method and system for processing a new continuous parameter which is not restricted to sequential occurrences of anomaly definitions or error log entries. In another aspect, the calibration of the diagnostic significance of anomaly definition clusters is based upon cases of related repairs and cases for all the repairs.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for analyzing continuous parameter data from a malfunctioning locomotive or other large land-based, self-powered transport equipment, comprising:

receiving new continuous parameter data comprising a plurality of anomaly definitions from the malfunctioning equipment;

selecting a plurality of distinct anomaly definitions from the new continuous parameter data;

generating at least one distinct anomaly cluster from the plurality of distinct anomaly definitions;

generating a plurality of weighted repair and distinct anomaly cluster combinations; and identifying at least one repair for the at least one distinct anomaly cluster using the plurality of weighted repair and distinct anomaly cluster combinations.

2. The method of claim 1 wherein the at least one distinct anomaly cluster comprises at least one of a single distinct anomaly and a plurality of distinct anomaly definitions.

3. The method of claim 1 wherein each of the plurality of weighted repair and distinct anomaly cluster combinations are generated from a plurality of cases, each case comprising a repair and at least one distinct anomaly, and each of the plurality of weighted repair and distinct anomaly cluster combinations being assigned a weight determined by dividing the number of times the combination occurs in cases comprising related repairs by the total number of times the combination occurs in said plurality of cases.

4. The method of claim 3 wherein identifying the at least one repair comprises selecting at least one repair using the plurality of weighted repair and anomaly cluster combinations and adding assigned weights for distinct anomaly clusters for related repairs.

5. The method of claim 1 said generating a plurality of weighted repair and distinct anomaly cluster combinations utilizes a plurality of repairs and continuous parameter data comprising a plurality of anomaly definitions.

6. The method of claim 1 wherein the receiving continuous parameter data comprises receiving a new continuous parameter data and comparing the new continuous parameter data to a prior continuous parameter data.

7. A system for analyzing continuous parameter data from a malfunctioning locomotive or other large land-based, self-powered transport equipment, comprising:

a directed weight data storage unit adapted to store a plurality of weighted repair and distinct anomaly cluster combinations;

a processor adapted to receive new continuous parameter data comprising a plurality of anomaly definitions from the malfunctioning equipment;

a processor for selecting a plurality of distinct anomaly definitions from the new continuous parameter data;

a processor for generating at least one distinct anomaly definition cluster from the selected plurality of distinct anomaly definitions;

a processor for generating a plurality of weighted repair and distinct anomaly definition cluster combinations; and a processor for identifying at least one repair for the at least one distinct anomaly definition cluster using the plurality of predetermined weighted repair and distinct anomaly definition cluster combinations.

8. The system of claim 7 wherein a single processor unit constitutes said processors.

9. A system of claim 7 further comprising:

a processor for generating a plurality of cases from the repair data and the continuous parameter data, each case comprising a repair and a plurality of distinct anomaly definitions;

a processor for generating, for each of the plurality of cases, at least one repair and distinct anomaly definition cluster combination, and a processor for assigning, to each of the repair and distinct anomaly definition cluster combinations, a weight, whereby weighted repair and distinct anomaly definition cluster combinations facilitate identification of at least one repair for the malfunctioning equipment.

10. The system of claim 9 wherein the processor for generating the plurality of cases comprises a processor for selecting a repair from the repair data and selecting a plurality of distinct anomaly definitions from the continuous parameter data over a period of time prior to the repair.

11. The system of claim 9 wherein the processor for assigning weights comprises a processor for determining, for each repair and distinct anomaly definition cluster combination, a number of times the combination occurs in cases comprising related repairs, and a number of times the combination occurs in the plurality of cases.

12. The system of claim 11 wherein the processor for assigning a weight, for each repair and distinct anomaly definition cluster combination, comprises a processor for dividing the number of times the combination occurs in cases comprising related repairs by the number of times the combination occurs in the plurality of cases.

13. The system of claim 11 further comprising;

a processor for generating a new case from repair data and continuous parameter data, the case comprising a repair and a plurality of distinct anomaly definitions;

a processor for generating, for the new case, a plurality of anomaly definition clusters for the plurality of distinct anomaly definitions; and a processor for redetermining a weight for each of the plurality of repair and anomaly definition cluster combinations to include the new case.

14. The system of claim 11 further comprising:

a repair log data storage unit adapted to store a plurality of repairs; and a continuous parameter data storage unit adapted to store a plurality of anomaly definitions.

* * * * *